United States Patent [19]

Palmer et al.

[11] Patent Number: 4,888,097
[45] Date of Patent: Dec. 19, 1989

[54] WATER PURIFICATION METHOD AND APPARATUS

[75] Inventors: David G. Palmer; David J. Shannon; Keith L. Vacha, all of Lincoln, Nebr.

[73] Assignee: Pure Water, Inc., Lincoln, Nebr.

[21] Appl. No.: 121,098

[22] Filed: Nov. 16, 1987

Related U.S. Application Data

[62] Division of Ser. No. 24,257, Mar. 10, 1987, Pat. No. 4,805,692.

[51] Int. Cl.$^4$ ............................................. B01D 3/42
[52] U.S. Cl. ........................................ 203/1; 203/2; 203/4; 203/10; 203/DIG.17; 203/DIG. 18; 203/DIG. 25; 73/304 R; 137/392; 137/395; 159/44; 202/176; 202/181; 202/206; 340/620
[58] Field of Search ................. 203/1, 2, 10, 11, 4, 203/DIG. 7, DIG. 18, DIG. 25, DIG. 17, DIG. 11; 202/181, 160, 176, 206, 193, 196; 159/43.1, 44; 73/304 R; 324/439; 340/603, 620; 137/392, 395; 219/287

[56] References Cited

U.S. PATENT DOCUMENTS

| | | | |
|---|---|---|---|
| 770,149 | 9/1904 | Bailey | 202/185.5 |
| 946,186 | 1/1910 | Wilson et al. | 202/242 |
| 1,115,590 | 11/1914 | Seaman | 202/84 |
| 1,284,406 | 11/1918 | Martens | 202/166 |
| 1,902,842 | 3/1933 | Eaton | 219/287 |
| 2,079,897 | 5/1937 | Brown | 202/196 |
| 2,368,665 | 2/1945 | Kohman et al. | 202/49 |
| 2,388,599 | 11/1945 | Cleaver et al. | 202/174 |
| 2,441,361 | 5/1948 | Kirgan | 202/181 |
| 2,485,999 | 10/1949 | Birchler et al. | 219/287 |
| 3,055,810 | 9/1962 | Skow | 202/71 |
| 3,207,282 | 9/1965 | Norris, Jr. | 194/15 |
| 3,254,333 | 5/1966 | Baumoel | 340/244 |
| 3,350,279 | 10/1967 | Tolchin | 202/83 |
| 3,434,934 | 3/1969 | Washer | 203/2 |
| 3,505,173 | 4/1970 | Randell | 202/189 |
| 3,694,321 | 9/1972 | Marovich et al. | 202/83 |
| 3,697,384 | 10/1972 | Walker | 203/1 |
| 3,749,753 | 7/1973 | Skraba | 202/181 |
| 3,930,959 | 1/1976 | Kirschmann | 202/181 |
| 4,045,293 | 8/1977 | Cooksley | 202/181 |
| 4,052,267 | 10/1977 | McFee | 202/206 |
| 4,107,511 | 8/1978 | Shulz et al. | 219/286 |
| 4,110,170 | 8/1978 | Kirschman et al. | 202/160 |
| 4,252,616 | 2/1981 | Glazer | 202/181 |
| 4,259,982 | 4/1981 | Bartels | 137/392 |
| 4,342,623 | 8/1982 | Loeffler | 202/83 |
| 4,343,987 | 8/1982 | Schimbke et al. | 219/287 |
| 4,525,243 | 6/1985 | Miller | 202/181 |
| 4,556,457 | 12/1985 | McCord | 203/1 |
| 4,600,844 | 7/1986 | Atkins | 307/113 |
| 4,601,789 | 7/1986 | Bjorklund | 202/167 |
| 4,622,103 | 11/1986 | Shirky-Elgood et al. | 202/197 |
| 4,628,302 | 12/1986 | Barr et al. | 340/620 |

Primary Examiner—Wilbur Bascomb
Attorney, Agent, or Firm—Price, Heneveld, Cooper, DeWitt & Litton

[57] ABSTRACT

A distillation type of water purification system has a raw water inlet valve for admitting raw water continuously to a boiling tank at a rate greater than the rate at which raw water is converted to treated water. A drain valve located at the bottom of the boiling tank is energized by a raw water level sensing device whenever the raw water level reaches a predetermined level, to discharge water from the boiling tank. Treated water is stored in a storage tank having a pump for discharging treated water to the user upon demand. A single conductivity sensor in the storage tank controls the pump to allow it to operate only if the sensed conductivity is above a first predetermined value but not at or above a second predetermined value greater than the first value. An improved condenser has two sets of tubes, each set is arranged in a pair of planes oriented transverse the flow of cooling air with the tubes parallel. The internal cross-sectional area of one set is about twice that of the other. Steam and condensate flows serially through the larger diameter tubes and then through the smaller diameter tubes in a flow countercurrent to the cooling air stream.

10 Claims, 2 Drawing Sheets

WATER PURIFICATION METHOD AND APPARATUS

This is a divisional of co-pending application Ser. No. 07/024,257 filed on Mar. 10, 1987, now U.S. Pat. No. 4,805,692.

BACKGROUND OF THE INVENTION

This invention relates to water purification systems and, in particular, to such systems that purify raw water by distillation.

Systems that purify water by distillation, in which raw water is converted to steam in a boiling tank and the steam subsequently converted to treated water, are well-known in the art.

In one such distillation water purification system developed by the inventors of the present invention, water is admitted to the boiling tank in periodic batches in response to a tank probe that indicates the need for additional raw water. Whenever such a batch is admitted, the head of steam in the apparatus has a tendency to collapse. This phenomena is disruptive to the distillation process, can cause stress on components of the apparatus and emits a displeasing sound. In addition, the apparatus must be periodically de-energized and the boiling tank drained to remove salts and minerals that have accumulated in the raw water.

In a prior art water purification system, disclosed in U.S. Pat. No. 3,055,810 to Ross E. Skow, raw water is supplied to the apparatus in excess of the amount required for the distillation process. The excess raw water is disposed to a drain through a pipe mounted at a desired water level. Because the excess raw water is circulated through the boiling tank, contaminants in suspension therein will be removed with the excess water. However, any contaminants that precipitate out of the raw water will accumulate in the bottom of the boiling tank and must be periodically removed.

In another such system disclosed in U.S. Pat. No. 3,505,173, issued to Forrest Thompson Randell, a salinometer is provided for a water distillation plant to monitor the purity of the treated water. When the treated water is not of a desired quality, an output pump is disabled and the impure condensate is fed back to the boiling tank for re-distillation.

SUMMARY OF THE INVENTION

According to one aspect of the present invention, a distillation type of water purification system has a raw water inlet means for admitting raw water continuously to the boiling tank at a rate greater than the rate at which raw water is converted to treated water. A drain valve means in the boiling tank is energized by a raw water level sensing means, whenever the raw water level reaches a predetermined level, to discharge water from the boiling tank for a predetermined brief period of time. In this manner, small batches of water are frequently purged from the system to reduce the concentration of salts and minerals without disrupting the purification process. The need for periodic cleaning of the boiling tank is thus greatly reduced.

In a preferred embodiment, the drain valve means is located at the bottom of the boiling tank to likewise discharge impurities that have precipitated from the raw water and have settled to the bottom of the tank. The need for boiling tank cleaning is, thus, yet further reduced.

According to another aspect of the invention, a distillation type of water purification system has a storage tank for treated water produced by the apparatus. A pump means discharges treated water from the storage tank to the user upon demand. A single conductivity sensing means in the storage tank controls the pump to allow the pump to operate only if the sensed conductivity is above a first predetermined value but not at or above a second predetermined value. The first predetermined value is selected to assure that treated water is contacting the sensing means. In this manner, the pump is protected from damage resulting from running dry. The second predetermined conductivity value is selected to prevent the apparatus from discharging water in which the impurity level, which is proportional to conductivity, exceeds a predetermined value. Thus, the single conductivity sensor performs two very useful functions at a reduced installed cost.

According to yet another aspect of the invention, such a distillation type of water purification system is provided with an improved condenser. The condenser is constructed from two sets of tubes, each of the tubes in a set identical and having a different cross-sectional area from the tubes of the other set. The tubes are interconnected such that steam flows serially therethrough, first through the larger area tubes and then through the smaller ones. The tubes in each set are parallel and arranged in a plane that is transverse to the flow of the cooling fluid. The plane having the smaller area tubes is located upstream in the flow of cooling fluid, i.e., closer to the source of cooling fluid, than the larger tubes. In this manner, the steam is provided adequate volume in which to expand, without building undesirable pressure in the boiling tank, yet complete condensation occurs in the condenser with minimum uncondensed vapors reaching the treated water holding tank. Further, the steam is condensed in a countercurrent flow to the cooling fluid, which increases heat transfer efficiency. In a preferred embodiment, the ratio of cross-sectional areas of the two tubes is about 2:1 and closely spaced fins are provided on the surfaces of the tubes in contact with the cooling fluid. In the most preferred embodiment, tubes in each set are arranged in two planes and are laterally offset, or staggered, between planes. This structure reduces the heat transfer boundary layer between the cooling fluid and the tubes which further increases the heat transfer efficiency of the condenser.

These and other related objects, advantages and features of this invention will become apparent upon review of the following specification in conjunction with the drawings.

DESCRIPTION OF THE PREFERRED EMBODIMENT

Figure 1:
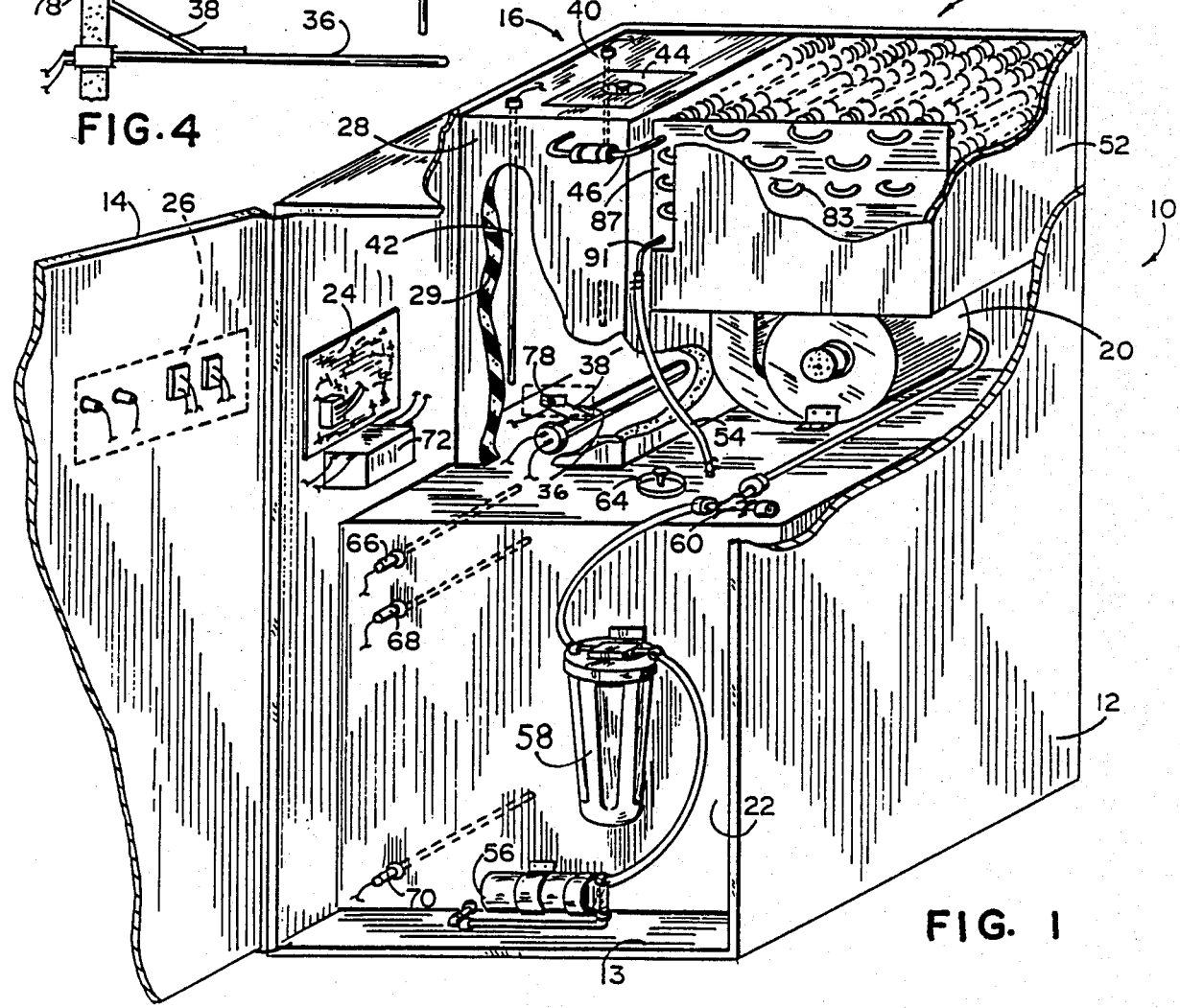
FIG. 1 is a perspective view of a water purification system according to the invention with a portion of the cabinet broken away, and the front panel opened, to view the internal components thereof.

Referring now specifically to the drawings, and the illustrative embodiments depicted therein, a water purification system 10 is shown generally in FIG. 1. The water purification system has a cabinet 12 that is open in the front at 13. A front panel 14 is mounted by a pair of hinges (not shown) to selectively cover opening 13.

Within cabinet 12 is a boiling tank 16, into which raw water that is to be treated is admitted for conversion to steam. The steam is condensed in a condenser 18 into treated water which is then stored in a storage tank 22 until used. A condenser fan 20 moves ambient air cooling fluid over condenser 18 to remove the heat given up in the condensation and cooling processes. An electronic control 24 is mounted to a sidewall of cabinet 12 and a display panel 26, on the outer face of panel 14, provides user inputs to control 24 and status lights to indicate the operating condition of the apparatus.

Figure 2:
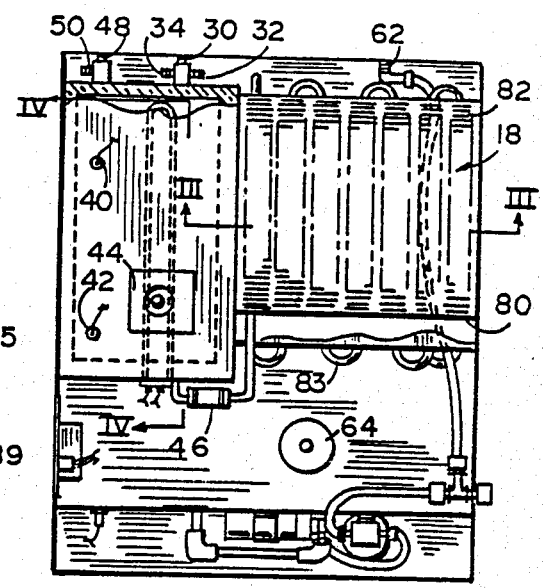
FIG. 2 is a top plan view of the apparatus shown in FIG. 1.
Figure 4:
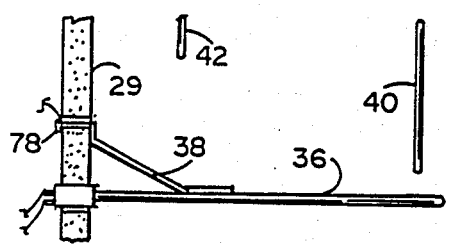
FIG. 4 is a sectional side elevation taken along the lines IV—IV in FIG. 2.

Boiling tank 16 is a stainless steel container 28 that is completely covered by insulation 29 to prevent loss of heat. As best seen in FIG. 2, an inlet valve 30 selectively admits raw water to container 28. Valve 30 is fitted with a normal feed solenoid 32 and a rapid feed solenoid 34. Normal feed solenoid 32, when energized, admits water to the boiling tank at a rate of 165 milliliters per minute which is preselected to be about 25 percent greater than the rate at which the raw water in the boiling tank is converted to steam, for reasons that will be disclosed below. Rapid feed solenoid 34, when energized, will admit water to the boiling tank at a rate significantly in excess of the normal feed solenoid and is useful in initially filling the tank. An electrical heater 36 is shown located in the bottom interior of container 28. This heater provides the means for heating the water to convert it to steam. As seen in FIG. 4, a heat conductor 38 has one end in contact with heater 36 and another end in contact with the wall on the outside of which a thermostat 78 is mounted. Under normal operating conditions, with the water level in the boiling tank above heater 36, insufficient heat is conducted through heat conductor 38 to thermostat 78 to actuate the thermostat. However, should the water level fall below the level of heater 36, a rapid buildup in heat will be transmitted through heat conductor 38 to energize thermostat 78 in order to de-energize the control and prevent damage to or destruction of container 28.

A drain valve 48 that is actuated by a motor 50 is located at the bottom on the rear of container 28. When motor 50 is actuated, drain valve 48 is opened after a brief period of delay, caused by the time required for motor 50 to actuate the valve, to withdraw water from container 28. When motor 50 is de-energized, the drain valve will be closed, again, after a delay caused by the time required for motor 50 to close the valve. An example of a motor and valve assembly is Unit Model No. 0691C0428HU00, manufactured by Motortrol Erie Control Manufacturing, in Milwaukee, Wisconsin.

Boiling tank conductivity sensing probes 40 and 42 extend downwardly from a top wall of container 28 to the interior of the boiling tank. Probe 40 extends to a lower level in the tank than probe 42. The purpose of the probes is to monitor and control the water level in the tank. An inspection and cleaning cover 44 is provided at a top wall of container 28 to gain access to the interior thereof.

Figure 3:
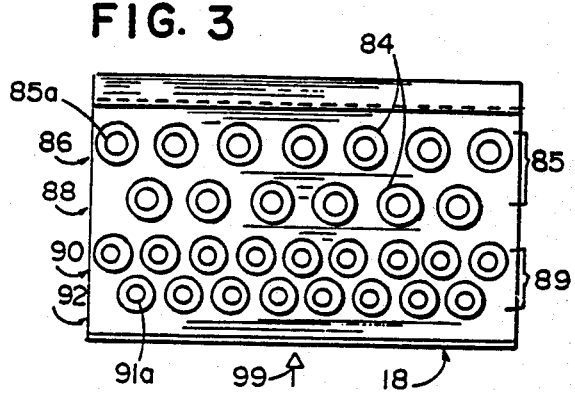
FIG. 3 is a sectional end elevation taken along the lines III—III in FIG. 2.

Steam generated in the boiling tank is transferred to condenser 18 through steam tube 46. As best seen in FIG. 3, condenser 18 is comprised of two sets of tubes 85, 89 that are supported at opposite ends by front and rear support brackets 80, 82. A plurality of interconnect means, or hairpin tubes or hairpins 83, interconnect the ends of adjacent tubes in such a fashion that steam and condensate flow serially through tubes 85 to tubes 89. Cooling air flow generated by fan 20 flows vertically upwardly first over the outer surfaces of tubes 89 and then over the outer surfaces of tubes 85 as generally shown by arrow 99.

The set of first tubes 85 are parallel each other and arranged generally in two planes 86, 88 that are transverse the flow of cooling air 99. The set of second tubes 89 are, likewise, parallel each other and disposed generally in two planes 90, 92 that are transverse the flow of cooling air 99.

Steam from boiling tank 16 enters a condenser inlet 87 (FIG. 1) that is connected to the lefthandmost tube 85a of the first tubes 85 in row 86. The steam and condensate mixture flows through the tubes in first tube plane 86 in a serpentine fashion, generally from left to right in FIGS. 2 and 3. The steam and condensate mixture then moves through the tubes in second tube plane 88, again in a serpentine fashion, generally from right to left in FIGS. 2 and 3. Steam and condensate mixture then flows through the tubes in third tube plane 90 in like manner to tubes in plane 86 and finally fourth tube plane 92 in a serpentine fashion in like manner to those in plane 88 to final tube 91a before exiting the condenser through outlet 91 as condensate or treated water.

The internal cross-sectional area of first tubes 85 is preselected to be larger than the internal cross-sectional area of second tubes 89. It has been determined by much experimentation that this arrangement provides an optimum heat transfer efficiency while not unduly creating excessive back pressure in the boiling tank. It is believed that the larger cross-sectional area of the first tubes provides adequate volume for the steam to move easily from the boiling tank through the first tubes while the reduced cross-sectional area of the set of second tubes creates sufficient pressure to reduce the velocity of steam and condensate moving through the second tubes. As a result, a greater percentage of the vapor is condensed into a liquid before leaving the condenser and the distillate is better cooled. The preferred ratio of cross-sectional areas between the first tubes and second tubes is approximately 2:1. This ratio can be achieved by using, for example, one-half inch diameter first tubes and three-eighths inch diameter second tubes. Also adding to enhance heat transfer efficiency, is the counterflow arrangement between the steam, which enters the top of the condenser, and the cooling air flow, which enters the bottom of the condenser.

A plurality of thin, plate-like fins 84 (FIG. 3) are spaced along, with good contact to, tubes 85, 89. The fins increase the surface area of each tube that is exposed to the cooling fluid to increase the rate of heat transfer. In addition, as best seen in FIG. 3, the tubes in successive planes are laterally offset, or staggered, such that the fins from one row to the next overlap as seen along the direction of air flow. Such an arrangement reduces the heat transfer boundary layer between the cooling fluid and the fins. As a result, the heat transfer efficiency of the condenser is improved even further. Tubes 85, 89 are preferably made of stainless steel while fins can be of aluminum.

Condenser 16 is surrounded by a rectangular shroud 52 through which the condenser fan 20 moves air. Air is drawn around the lower perimeter of cabinet 12, through a gap between the bottom of the cabinet and the floor Air that has passed over the condenser exits through a grill on the top of the cabinet 12 (not shown).

Treated water that leaves condenser outlet 91 travels through an output tube 54 downwardly to storage tank 22. A demand pump 56 draws water from storage tank 22 upon a demand for water from the system. The output of pump 56 is connected through a filter 58 to a coupling 60 at a cabinet side and a coupling 62 at the cabinet rear. Couplings 60, 62 provide alternative interface between the system 10 and house plumbing (not shown). An inspection cover 64 is provided to gain entry to storage tank 22.

A conductivity sensing probe 66 penetrates a wall of storage tank 22 at a point close to the top of the tank. A second, intermediate level probe, 68 is mounted closely below probe 66. A third probe 70 is mounted near the bottom of tank 22, preferably within the bottom quartile. The function of these probes will be described in detail below.

Figure 5:
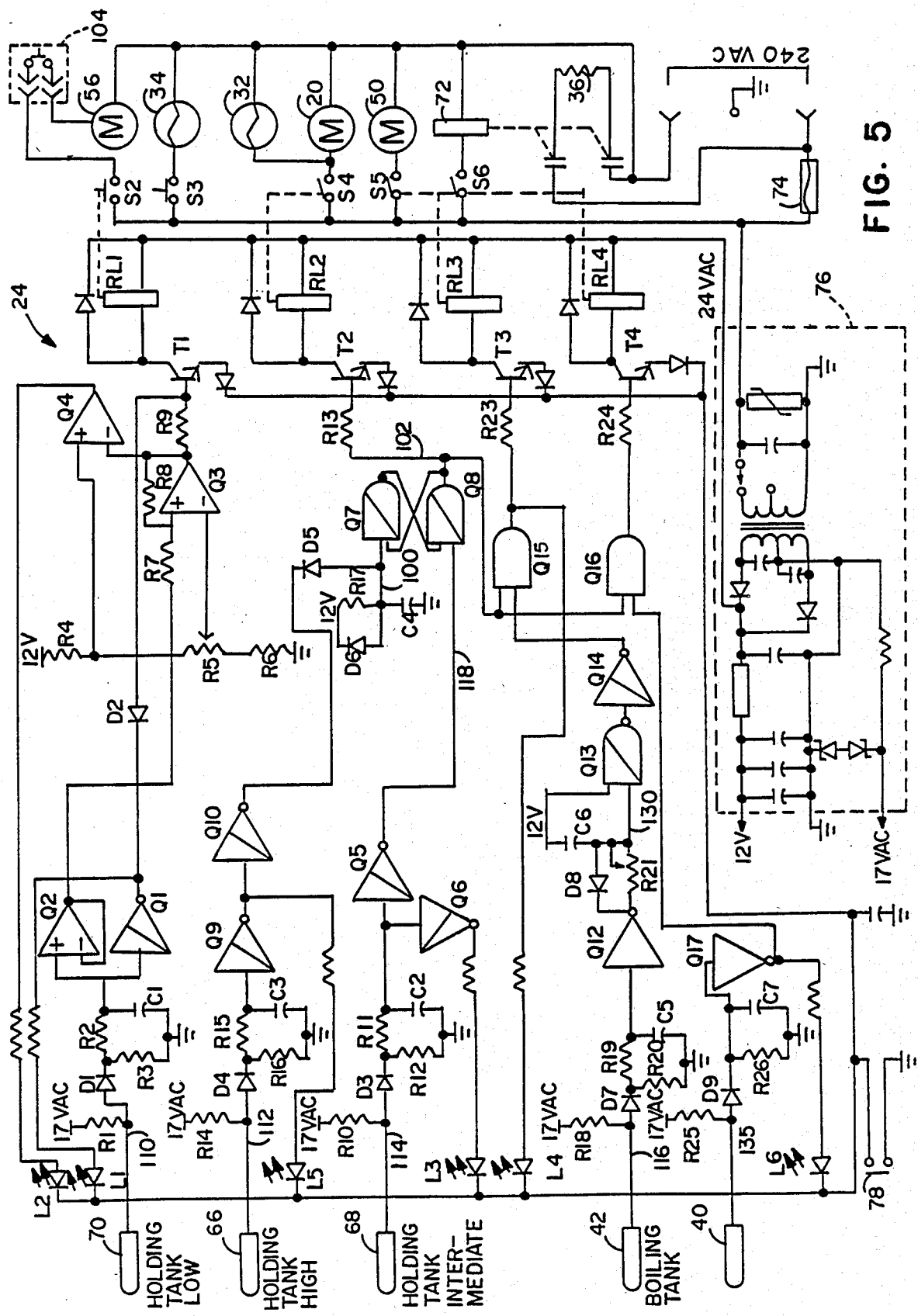
FIG. 5 is a schematic diagram of the control of the present invention.

Referring now to FIG. 5, the operation of control 24 will be described in detail. The control is designed to operate from a 240 volt AC power supply, which is primarily required in order to operate heater 36. One supply conductor, or 120 VAC, is supplied through fuse 74 to a power supply 76, which produces outputs of 12 volts regulated DC, 24 volts unregulated rectified AC and 17 volts unregulated AC. Power supply 76 is conventional and will not be described in detail.

Holding tank low probe 70 senses the conductivity between itself and the tank wall, which is at ground potential. Probe 70 forms a voltage divider with resistor R1 between 17 VAC and ground. The voltage from this voltage divider on line 110 is rectified by diode D1 and filtered by a network comprising resistors R2, R3 and capacitor C1. The output from this filter is fed to an inverter Q1 and to a linear amplifier Q2. The output of inverter Q1 is connected through a diode D2 to the base of a transistor T1. The output of amplifier Q2 is fed back to its inverting input, which has the effect of making Q2 a unity-gain amplifier. The output of Q2 is additionally fed through a resistor R7 to the non-inverting input of a comparator Q3. The inverting input to Q3 is connected to the wiper of a potentiometer R5 which forms a voltage divider with fixed resistors R4, R6 between 12 volts DC and ground. R5 is a conductivity level set point adjustment that is set in the factory. The output of comparator Q3 is connected to the base of transistor T1 through resistor R9. The collector of transistor T1 is connected to one lead of relay coil RL1, the other lead of which is connected to the 24 VAC line. The output of Q3 is also connected to the non-inverting input through a feedback resistor R8 which functions to provide hysteresis to Q3 to prevent it from rapidly switching output states. The output of Q3 is additionally connected to the inverting input of a comparator Q4 whose non-inverting input is connected to a fixed voltage level from resistor R4. The output of comparator Q4 is connected to a "purity alert" light L2 and will energize the light whenever the output of Q3 is high. Relay RL1, when energized, closes normally open contact S2 which, in turn, energizes demand pump motor 56 if a demand switch 104 is closed, indicating a demand for treated water. Switch 104 is intended to be located remote from the apparatus.

In operation, if there is a sufficient quantity of water in the holding tank 22 to contact probe 70, the increased conductivity (decrease in impedance) will cause the voltage at 110 to be lower than the threshold voltage of inverter Q1. As a result, the output of Q1 will be high, which will back-bias diode D2. In this state, Q1 will have no effect on the operation of transistor T1 by comparator Q3 to be described below. If, however, the level of water in tank 22 drops below probe 70, the voltage at line 110 will increase causing the output of inverter Q1 to go low. This will forward-bias diode D2 and in turn inhibit the base of transistor T1 from going high. As a result, Q3 will be prevented from driving the transistor into a conducting state and transistor T1 will be prevented from energizing relay RL1. Demand pump 56 will, therefore, not be energized in response to a command from demand switch 104.

As the conductivity sensed by probe 70 increases due to impurities in the treated water, the voltage at 110 will decrease and the output of amplifier Q2 will be proportionately lower. If the output of Q2, which is fed to the non-inverting input of Q3, is lower than the voltage on the wiper of purity set point resistor R5, connected to the inverting input of Q3, then the output of Q3 will switch to 1 a low state. This low output will switch off transistor T1 and de-energize relay RL1 preventing the demand switch 104 from operating pump 56.

Thus, demand pump 56 will be able to operate only if probe 70 senses a conductivity above a first predetermined level, indicative of water contacting the probe, but not at or above a second predetermined level, indicative of a concentration of impurities. The first predetermined level is approximately zero micromhos and the second level is approximately 50 micromhos. If the output from comparator Q3 is low, the output of Q4 will go high and energize a purity alert light L2. A high output from Q1 will energize light L2 to indicate a minimum water level in the holding tank.

The operation of the intermediate and high holding tank probes 66, 68 will now be described. Holding tank high probe 66 forms a voltage divider at 112 with resistor R14 between the 17 VAC line and the tank wall, which is ground. The holding tank intermediate probe 68 forms a voltage divider at 114 with resistor R10 between 17 VAC and ground. The voltage at 112 is rectified through diode D4, filtered by resistors R15, R16 and capacitor C3 and connected through inverters Q9 and Q10 and diode D5 to the input of a Nand gate Q7. This same input is connected to the junction between a capacitor C4 and a parallel arrangement of a diode D6 and resistor R17. This network is connected between 12 volts DC and ground.

The voltage at 114 is rectified by diode D3, filtered by resistors R11, R12 and capacitor C2 and passed through an inverter Q5 to the input of a Nand gate Q8. Nand gates Q7 and Q8 are arranged as a latch having an output 102 that forms an enabling line connected to the base of a transistor T2 through resistor R13. Transistor T2 has a collector connected to one lead of the coil of relay RL2, and the other of which is connected to 24 VAC, and will operate the relay in response to a positive voltage from enabling line 102. Relay RL2 operates switch S4 which in turn energizes cooling fan motor 20 and raw water inlet valve solenoid 32.

With the water level in holding tank 22 below the level of probe 68, the voltage at 114 will be relatively high and the output of Q5 in a low state. Thus, the input 116 to gate Q8 will be low which will set the output of Q8 at a high state. This output will energize relay RL2 through transistor T2, thus energizing the inlet valve 32 and cooling fan motor 20. Under these circumstances, the voltage at 112 will also be relatively high, because the water level will also be below probe 66. The output of Q9 will thus be in a low state and the output of Q10 in a high state. This will back-bias diode D5 and allow the input 100 to Q7 to be pulled to a high state by resistor R17 connected to 12 VDC. The other input to Q7 will be high, because it is connected to the output of Q8. The output of Q7 will thus be in a low state and will, in turn, be fed to Q8, maintaining Q8 at a high state.

Upon the level of water in tank 22 contacting intermediate probe 68, the output of inverter Q5 will switch to a high state but this will have no effect on the state of gate Q8 because the other input to Q8 is held in a low state. As water in the tank 22 continues to rise and contacts probe 66, the voltage at 112 will be lowered, the output of Q9 will switch to a high state and the output of Q10 will go low. This will cause diode D5 to be forward-biased and the input line 100 to Q7 to switch to a low state. This in turn will cause the output of Q7 to switch to a high state and, since the other input 118 to gate Q8 is already high, will cause the output line 102 of gate Q8 to switch to a low state. This will remove the voltage from the base of transistor T2, which will remove the current energizing relay RL2, and thus de-energize inlet valve 32 and fan motor 20. The switching of enabling line 102 to a low state, upon water contacting high probe 66, will additionally de-energize the boiling tank heater and drain valve in a manner to be described below.

The purpose of the capacitor C4, resistor R17 and diode D6 network is to assure that the input 100 assumes a high level upon circuit energization to prevent the existence of an indeterminate state. Optional lamps L5, operated by the output of inverter Q9, and L3, operated by the output of an inverter Q6 connected to the input of inverter Q5, may be provided to indicate when water in the holding tank is contacting the high and intermediate probes, respectively.

Thus, it is seen that the intermediate tank probe 68 and high tank probe 66 function as a latch arrangement to de-energize the water purification system apparatus when the water in the holding tank has reached the high probe, by resetting the latch, and re-energizing the water purification system apparatus upon the water in the holding tank dropping to a level below the intermediate tank probe, by setting the latch.

The operation of the boiling tank portion of the control will now be described in detail. Probe 40 is mounted in tank 16 to sense a first predetermined level of water therein and probe 42 is mounted in boiling tank 16 to sense a second predetermined water level higher than the first level. Probe 42 forms a voltage divider with resistor R18 connected between 17 VAC and the wall of container 28 which is at ground potential. Output 116 from the voltage divider is rectified through diode D7 and filtered through a network comprising resistors R19, R20 and capacitor C5. This network is, in turn, connected to inverter Q12 and the output of Q12 is connected to an input 130 of NAND gate Q13 through the parallel combination of a diode D8 and a variable resistor R21. Input 130 is additionally connected to 12 VDC through a capacitor C6. The other input to Q13 is maintained at a constant high level by direct connection to 12 VDC. The output of Q13 is connected to an input of AND gate Q15 through an inverter Q14. The output of gate Q15 is connected through a resistor R23 to the base of a transistor T3. The collector of T3 is connected to one lead of the coil for relay RL3, the other lead of which is connected to 24 VAC. Relay RL3 in turn operates normally open switch S5 to control boiling tank drain valve motor 50.

The circuit connected to boiling tank probe 42 operates as follows. Assuming water in the boiling tank is at a level below probe 42, the voltage at 116 will be relatively high and will therefore drive the output of inverter Q12 to a low state. This will, in turn, cause diode D8 to be forward-biased and will immediately charge capacitor C6 from the 12 VDC source through diode D8 and inverter Q12. Therefore, input 130 to gate Q13 will be low and its output will in turn be high. Inverter Q14 will invert the high state and present it as an input to gate Q15 which will thus have a low output. As a result, the base drive will be removed from transistor T3 and relay RL3 will be de-energized. Switch S5 will be open and power removed from motor 50, closing drain valve 48 after a delay, as explained below.

Once water in the tank rises to a level sufficiently high to contact probe 42, the voltage at 116 will decrease, the output from Q12 will switch to a high state. Because capacitor C6 is initially fully charged, diode D8 will be reverse-biased. The result is that capacitor C6 will be gradually discharged over a period of about 10 seconds through resistor R21 and inverter Q12. This will switch input 130 to a high state after the 10 second delay period, in turn driving the output of gate Q13 to a low state. The input to Q15 from Q14 will therefore be in a high state and, assuming the enabling line 102 is also in a high state, the output of Q15 will also be in a high state. Transistor T3 will therefore be driven to energize relay RL3. This will close switch S5 and energize the dump valve motor 50 causing water to be drained from the boiling tank after a delay period resulting from the time required for motor 50 to open drain valve 48.

The water level in the boiling tank will continue to rise after contacting probe 42 because of the 10 second circuit delay period and the delay in opening the valve 48. However, the opening of drain valve 48 will rapidly decrease the water level in the boiling tank 16, exposing probe 42. This will cause the voltage at 116 to increase and the output from Q12 to switch to a low state. Capacitor C6 will immediately charge through forward-biased D8. The result is that input 130 to Q13 will go to a low state and cause the output at Q13 to switch to a high state. This will de-energize transistor T3, relay RL3 and drain valve motor 50, closing the drain valve after a delay period resulting from the time required for motor 50 to open the valve. An optional light L4 may be connected to the output of gate Q15 to indicate when the drain valve 48 is open.

Probe 40 forms a voltage divider with resistor R25 connected between 17 VAC and and the wall of container 28 which is at ground potential. The output 135 of this voltage divider is connected by a diode D9 to an inverter Q17. The output from Q17 is connected as an input to an AND gate Q16. The other input to gate Q16 is from enabling line 102. The output of gate Q16 is connected to the base of a transistor T4 through resistor R24. The collector of transistor T4 is connected to a lead of the coil of relay RL4 the other lead of which is connected to 24 VAC. Relay RL4 in turn operates normally open contact S6. S6, when closed, energizes contactor 72 which applies 240 VAC across heater 36. As long as the water level stays in contact with probe 40 the input to inverter Q17 will be low and its output at a high state. If enabling line 102 is also high then the output of Q16 will be high, which will energize transistor T4 and relay RL4. This will close switch S6, energizing contactor 72 and therefore heater 36. If the water level drops below probe 40, the input of Q17 will switch to a high state and the output of Q16 will switch to a low state. This, in turn, will de-energize heater 36 and illuminate an alert light L6.

The safety thermostat 78 connects the control ground potential to system chassis ground. Should the water level in boiling tank 16 fall below the heating element, heat will rapidly be conducted through heat conductor 38, through the wall of container 28 and hence to thermostat 78. Thermostat 78 will open and the entire control system will be disabled.

A manually operable switch S3 is connected to a rapid feed solenoid control for inlet 30. Upon system start-up or after the system has been drained of water, switch S3 can be manually energized to rapidly fill the boiling tank with raw water.

Changes and modifications in the specifically described embodiments can be carried out without departing from the scope of the invention which is intended to be limited only by the scope of the appended claims.

The embodiments of the invention in which an exclusive property or privilege is claimed are defined as follows:

1. A water purification system comprising:
   a boiling tank;
   heating means for converting raw water in said boiling tank to steam at a predetermined conversion rate;
   condensing means for converting steam produced in said boiling tank to pure water including a condenser and cooling means for cooling said condenser;
   conveying means for conveying steam from said boiling tank to said condensing means; and
   control means for purging raw water and contaminants from said boiling tank in small, frequent batches including
   raw water inlet means operable for continuously admitting raw water to said boiling tank from a raw water source at a constant first predetermined rate that is significantly greater than said conversion rate,
   raw water level sensing means responsive to the level of water in said boiling tank for producing a first signal when raw water is below a predetermined level in said boiling tank and a second signal when raw water is at or above said predetermined level, and
   drain valve means responsive to said level sensing means for discharging raw water from said boiling tank in response to said second signal and for not discharging water from said boiling tank in response to said first signal.

2. The water purification system in claim 1 wherein said control means further includes delay means for delaying the discharge of water by said drain means for a predetermined period after receiving said second signal.

3. The water purification system in claim 2 wherein said predetermined period is approximately 10 seconds.

4. The water purification system in claim 1 wherein said first predetermined rate for admitting raw water is approximately 25 percent greater than said conversion rate.

5. The water purification system in claim 4 wherein said first rate for admitting raw water is approximately 165 milliliters per minute.

6. The water purification system in claim 4 further having a second raw water inlet means manually operable for admitting raw water to said boiling tank at a second rate significantly greater than said first rate for admitting raw water.

7. The water purification system in claim 1 further having temperature responsive means thermally coupled to said heating means for de-energizing said control means at a predetermined elevated temperature, wherein said predetermined temperature will be reached if the level of raw water in said boiling tank falls below the level of said heating means.

8. A method of operating a water purification system having a boiling tank, heating means for converting raw water in said boiling tank to steam at a predetermined conversion rate, condensing means for converting said steam to pure water, and means for conveying steam from said boiling tank to said condensing means, said method including purging raw water and contaminants from the boiling tank in small, frequent batches by performing the steps of:
   continuously admitting raw water to said boiling tank from a raw water source at a constant first predetermined rate that is significantly greater than said conversion rate;
   sensing the level of raw water in said boiling tank;
   producing a first signal during said step of sensing when raw water is below a predetermined level in said tank;
   producing a second signal during said step of sensing when raw water is at or above said predetermined level in said tank; and
   discharging raw water from said boiling tank in response to said second signal; and not discharging water from said boiling tank in response to said first signal.

9. The method in claim 8 wherein said step of discharging water from said boiling tank is performed in response to said second signal only after a preselected period of delay.

10. The method in claim 9 wherein said period of delay is approximately 10 seconds.

* * * * *